(12) United States Patent
Takashima

(10) Patent No.: US 6,828,608 B2
(45) Date of Patent: Dec. 7, 2004

(54) SEMICONDUCTOR INTEGRATED CIRCUIT DEVICE

(75) Inventor: Daisaburo Takashima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 10/403,099

(22) Filed: Apr. 1, 2003

(65) Prior Publication Data

US 2003/0214018 A1 Nov. 20, 2003

(30) Foreign Application Priority Data

Apr. 1, 2002 (JP) ........................................ 2002-099061

(51) Int. Cl.$^7$ ..................... H01L 29/80; H01L 31/112
(52) U.S. Cl. ..................................... 257/259; 257/664
(58) Field of Search ................................ 257/259, 662, 257/664; 375/288

(56) References Cited

U.S. PATENT DOCUMENTS 5,931,927 A    8/1999   Takashima ................... 710/65

6,586,786 B2 * 7/2003 Kitazawa et al. ........... 257/275
6,683,912 B1 * 1/2004 Kole ........................... 375/257

OTHER PUBLICATIONS

T. Kawahara, et al., IEEE Journal of Solid–State Circuits, vol. 30, No. 9, pp. 1030–1034, "Low–Power Chip Interconnection by Dynamic Termination", Sep. 1995.

* cited by examiner

Primary Examiner—Hoai Pham
(74) Attorney, Agent, or Firm—Oblon, Spivak, McClelland, Maier & Neustadt, P.C.

(57) ABSTRACT

A semiconductor integrated circuit device having an input buffer connected to an input terminal, includes: a transfer gate one node of which is connected to the input terminal and the other node to an internal circuit, the transfer gate being on in an ordinary state; a transmission line connected to the other node of the transfer gate; and a control circuit configured to detect level transition of an input signal on the input terminal and drive to turn off the transfer gate after the input signal is transferred through the transfer gate and before a lapse of while the input signal makes a round trip on the transmission line.

6 Claims, 3 Drawing Sheets

SEMICONDUCTOR INTEGRATED CIRCUIT DEVICE

CROSS-REFERENCE TO RELATED APPLICATION

This application is based on and claims the benefit of priority from the prior Japanese Paten Application No. 2002-099061, filed on Apr. 1, 2002, the entire contents of which is incorporated herein by reference.

BACKGROUND OF THE INVENTION

1. Field of the Invention

This invention relates to a semiconductor integrated circuit device with a high-speed performance.

2. Description of Related Art

Information process systems having an LSI chip, e.g., semiconductor memory, mounted on a print circuit board (PCB) are increasingly improved to have a high-speed performance. When the signal frequency utilized in such systems reaches to 1 GHz, further to 10 GHz. electric signals transmitted on the signal lines on the PCB become signal waves (i.e., electromagnetic waves), and signal reflection at a signal input terminal becomes a subject to be solved. In detail, interference between an advancing wave and a retrograding wave causes a signal to be ringing. As a result, there is a fear that the LSI chip fails to distinguish the input signal.

To prevent the LSI chip from signal wave reflecting at the signal input terminal, it is required to dispose a resistive terminator, i.e., to connect a terminating resistor whose impedance is matched with a characteristic impedance of the signal line. However, if a termination resistor is disposed at a transmission line, static current flows therein. Therefore, the system will consume waste power.

Another approach is to dispose a switch device between the termination resistor and the transmission line so as to selectively cause it on only when signals are transmitted. However, this also is impossible to perfectively reduce the waste power consumption. Therefore, it is required for a driving circuit of the LSI chip to have large drivability.

SUMMARY OF THE INVENTION

A semiconductor integrated circuit device having an input buffer connected to an input terminal, comprises:

a transfer gate one node of which is connected to the input terminal and the other node to an internal circuit, the transfer gate being on in an ordinary state;

a transmission line connected to the other node of the transfer gate; and a control circuit configured to detect level transition of an Input signal on the input terminal and drive to turn off the transfer gate after the input signal is transferred through the transfer gate and before a lapse of while the input signal makes a round trip on the transmission line.

DETAILED DESCRIPTION OF THE EMBODIMENTS

Figure 1:
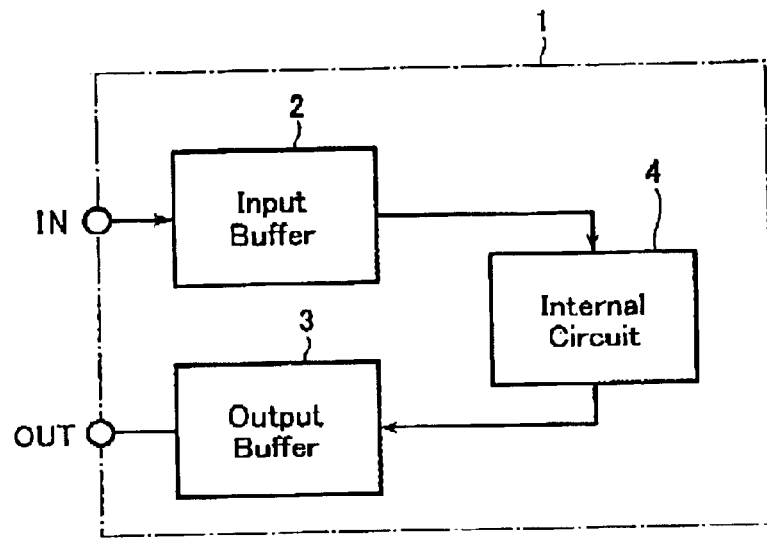
FIG. 1 shown a schematic configuration of an LSI chip according to an embodiment of the present invention.

Referring to the drawings, embodiments of the invention will be described bellow.

FIG. 1 shows a schematic configuration of an LSI chip according to an embodiment. The LSI chip 1 has an internal circuit 5, to which a signal is supplied via an input buffer 2 from a signal input terminal IN. The output signal from the internal circuit 4 is output to an output terminal OUT via an output buffer 2. Although one input terminal IN and one output terminal OUT are typically shown here, it should be appreciated that plural input and output terminals are usually prepared, respectively. Further, in another case, input and output terminals are commonly used.

Figure 2:
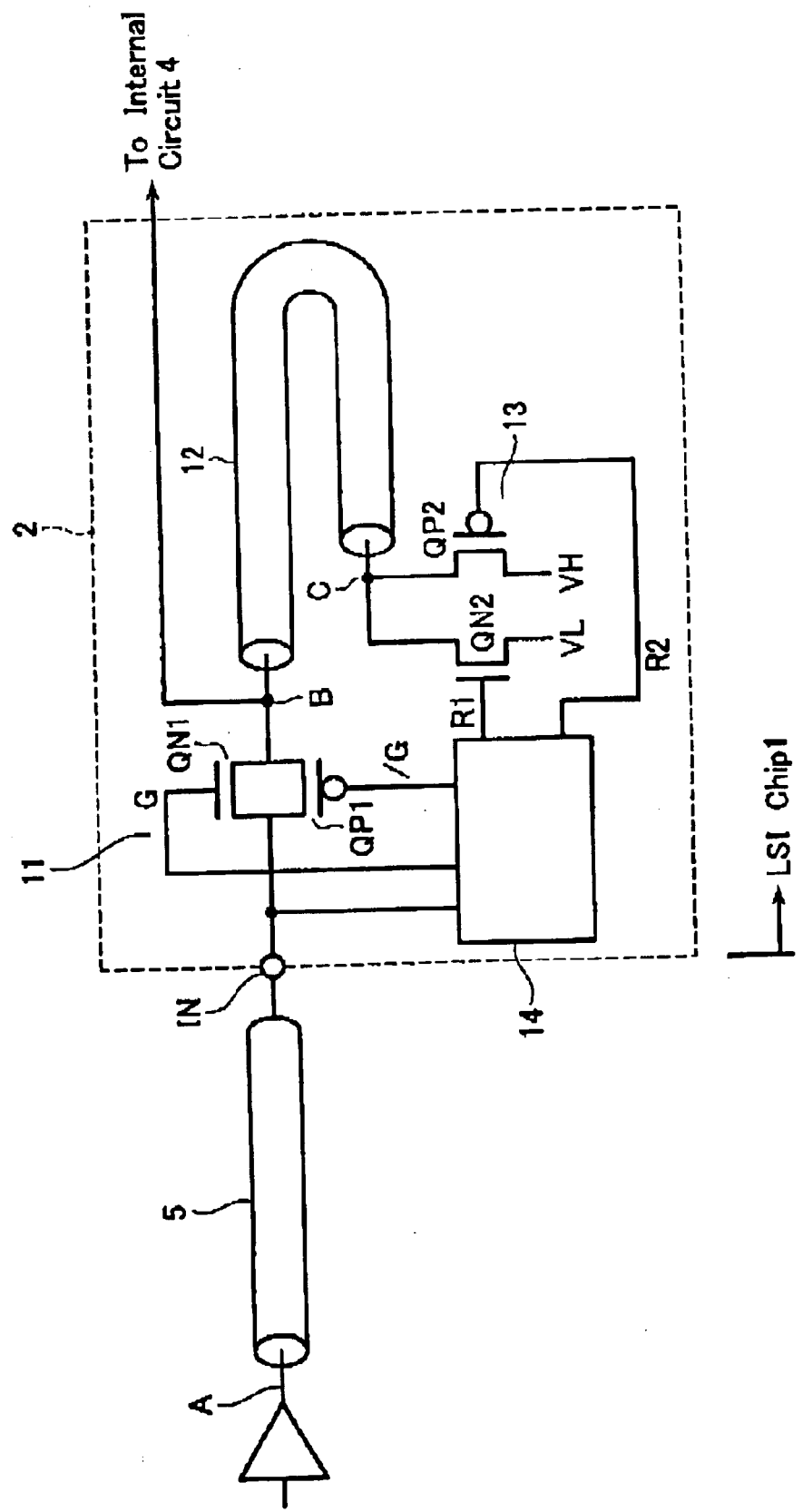
FIG. 2 shows an input buffer circuit of the LSI chip.

FIG. 2 shows a configuration of the input buffer 2 of the LSI chip 1 shown in FIG. 1. To the signal input terminal IN, to which an external transmission line 5 is connected, connected is one node of a transfer gate 11. The transfer gate 11 is a CMOS type one that an NMOS transistor QN1 and a PMOS transistor QP1 are connected in parallel with each other. To the other node B of the transfer gate 11, a transmission line 12 is connected. To secure a certain transmission length in a small space (i.e., to secure a signal propagation time), the transmission line 12 is formed to have a folded pattern.

The transfer gate 11 is in an on-state in an ordinary state. When an input signal is supplied to the signal input terminal IN, the transfer gate 11 is turned off before a lapse of while the input signal makes a round trip on the transmission line 12. As a result, the transfer gate 11 serves for shutting up the input signal in the input buffer 2 without outputting back to the external transmission line 5. For this purpose, a control circuit 14 is prepared to control the transfer gate 11 by detecting level change of the input signal supplied to the input terminal IN. In detail, the control circuit 14 detects a falling transition from a high level to a low level and a rising transition from a low level to a high level of the input signal so as to generate control signals G, /G which are used for turning off the transfer gate 11 for certain periods at the falling and rising transition times, respectively.

To the end C of the transmission line 12, connected is a termination circuit 13 for suppressing ringing due to the signal wave advancing/retrograding on the transmission line 12. In detail, the termination circuit 13 is formed of a PMOS transistor QP2 and NMOS transistor QN2 for applying a high voltage VH and a low voltage VL to the transmission line 12, respectively. These transistors QP2, QN2 also are controlled by the control circuit 14. The control circuit 14 controls to selectively turn on these transistors QP2, QN2 as being simultaneous with off-driving of the transfer gate 11. As a result, the termination circuit 13 suppresses ringing due to round trips of the signal wave on the transmission line 12 when an input signal is supplied to the input terminal IN.

Figure 3:
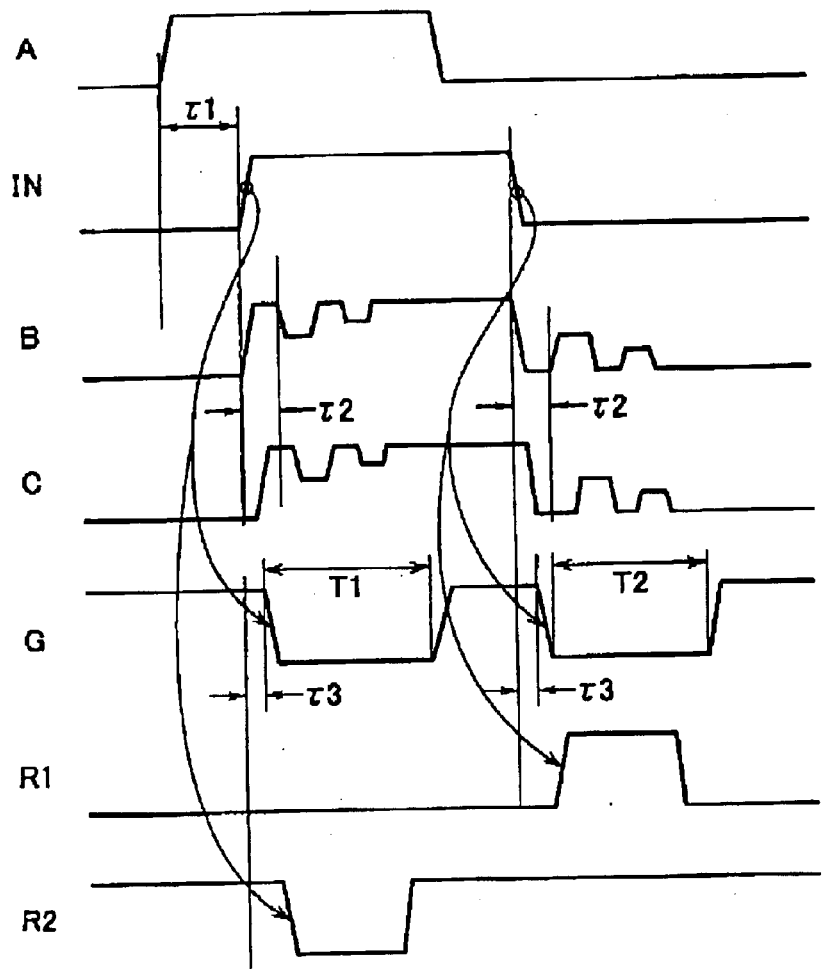
FIG. 3 is a timing diagram for explaining the operation of the input buffer circuit.

Referring to FIG. 3, the operation of the input buffer 2 in accordance with this embodiment will be explained. From a terminal A of the external transmission line 5, a signal is supplied to the input terminal IN of the LSI chip 1. In FIG. 3, the signal propagation delay time is shown by τ1. The control circuit 14 detects the rising transition from a low level to a high level of the input signal to generate control signals G and /G which turn off the transfer gate 11 during a certain period (T1). The control circuit 14 also detects the falling transition from a high level to a low level of the input signal to generate control signals G and /G which turn off the transfer gate 11 during a certain period (T2). It is appreciated that T1 and T2 may be set to be identical with each other, or to be different from each other.

As shown in FIG. 3, it is important that a delay time τ3 defined as from the level transition detection timing to the off-driving timing of the transfer gate 11 is shorter than a period τ2 which is taken for the input signal to make a round trip on the transmission line 12. In other words, the length of the transmission line 12 is determined in such a manner that the input signal input to the transmission line 12 is never returned to the external transmission line 5 via the transfer gate 11 during the delay time τ3. Under such the condition, the input signal input to the input buffer 2 will not be reflected and returned back to the external transmission line 5.

As above described, by turning off the transfer gate 11, the input signal is shut in the transmission line 12. However, if the termination circuit 13 is not disposed, ringing is superimposed to the signal at the node B, which becomes an input signal to be supplied to the internal circuit 4, due to the signal advancing/retrograding, as shown in FIG. 3. To suppress such the ringing, the termination circuit 13 will be operated as follows. The control circuit 14 detects the rising transition of the input signal from the low level to the high level at the input terminal IN to generate a gate driving signal R2 becoming low synchronously with the control signals G, /G. In response to the gate driving signal R2, the PMOS transistor QP2 turns on. Therefore, when the signal shut in the transmission line 12 is at a high level, high voltage VH is forcibly applied to the end C. As a result, the transition from the high level to the low level of the signal shut in the transmission line 12, which is generated based on interference between the input signal wave and a reflected wave thereof, may be suppressed, whereby the ringing may be suppressed.

The control circuit 14 also detects the falling transition of the input signal from the high level to the low level at the input terminal IN to generate another gate driving signal R1 becoming high synchronously with the control signals G, /G. In response to the gate driving signal R1, the NMOS transistor QN2 turns on, whereby the low voltage VL is forcibly applied to the end C. As a result, the ringing of the signal shut in the transmission line 12 at low level side may be suppressed.

In order to make the signal shutting by the transfer gate 11 and the transmission line 12 effective, it is required for the transmission line 12 to be long with a predetermined value or more. For this purpose, in FIG. 2, the transmission line 12 is formed to have a folded pattern. As a result, the signal line length of the control signals R1, R2, which are transmitted from the control circuit 14 to the end C of the transmission line 12, become shorter than the transmission line 12.

Figure 4A:
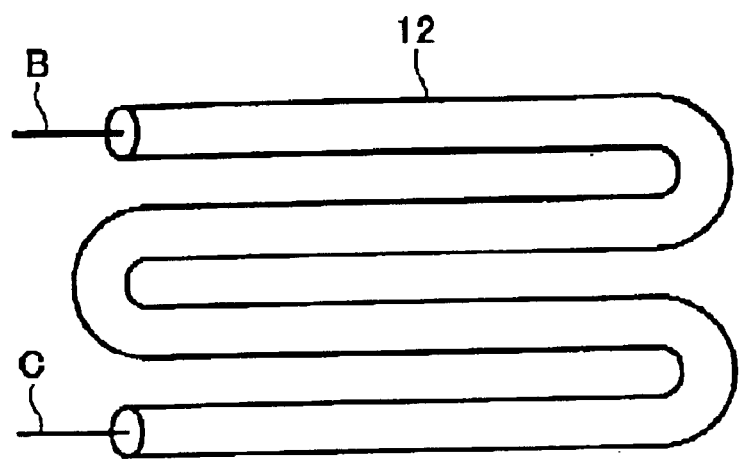
FIGS. 4A and 4B show other transmission line patterns.
Figure 4B:
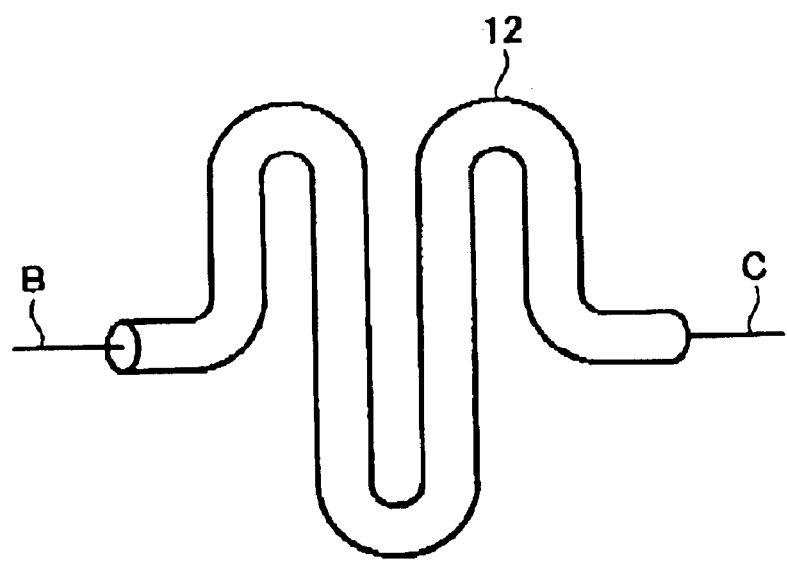

FIGS. 4A and 4B show other patterns of the transmission line 12. To secure the length of the transmission line 12 in a limited space, it is effective to use zigzag patterns as shown in FIGS. 4A and 4B.

As above-described, according to the embodiment, after inputting the input signal, the transfer gate 11 is turned off before a lapse of while the input signal makes a round trip on the transmission line 12. By use of such a scheme, when viewing the LSI chip 1 from the external transmission line 5, it becomes to substantially have a resistive terminator. However, termination current does not flow in contrast to such a case that a terminating resistor is disposed. Therefore, the system, In which the LSI chip 1 is incorporated, becomes to be able to do high-speed signal processing without waste power consumption.

In addition, the termination circuit 13 applies the high voltage VH and low voltage VL to the end C of the transmission line 12 corresponding to the level transitions of the signal shut in it. As a result, ringing may be effectively suppressed.

Having described the embodiments of the present invention, other embodiments and variations will be apparent to those skilled in the art. Therefore, the invention should not be viewed as limited to the disclosed embodiments but rather should be viewed as limited only by the spirit and scope of the appended claims.

What is claimed is:

1. A semiconductor integrated circuit device having an input buffer connected to an input terminal, comprising:

a transfer gate one node of which is connected to said input terminal and the other node to an internal circuit, said transfer gate being on in an ordinary state;

a transmission line connected to the other node of said transfer gate; and a control circuit configured to detect level transition of an input signal on said input terminal and drive to turn off said transfer gate after said input signal is transferred through said transfer gate and before a lapse of while said input signal makes a round trip on said transmission line.

2. The semiconductor integrated circuit device according to claim 1, further comprising:

a termination circuit connected to the end of said transmission line and controlled by said control circuit so as to apply a high voltage and a low voltage to said transmission line in the respective off-state periods of said transfer gate after transitions of said input signal from a low level to a high level and from a high level to a low level, respectively.

3. The semiconductor integrated circuit device according to claim 2, wherein said termination circuit comprises:

a PMOS transistor driven by said control circuit to turn on after transition from the low level to the high level of said input signal, thereby applying the high voltage to said signal transmission line; and an NMOS transistor driven by said control circuit to turn on after transition from the high level to the low level of said input signal, thereby applying the low voltage to said signal transmission line.

4. The semiconductor integrated circuit device according to claim 1, wherein said transfer gate is a CMOS transfer gate.

5. The semiconductor integrated circuit device according to claim 1, wherein said transmission line has a folded pattern.

6. The semiconductor integrated circuit device according to claim 1, wherein said transmission line has a zigzag pattern.

* * * * *